June 7, 1949. E. ZOERLEIN 2,472,327
DISTRIBUTOR COUPLING
Filed July 19, 1945

*Emil Zoerlein*
INVENTOR.

Patented June 7, 1949

2,472,327

UNITED STATES PATENT OFFICE 2,472,327

DISTRIBUTOR COUPLING

Emil Zoerlein, Dearborn, Mich., assignor to Ford Motor Company, Dearborn, Mich., a corporation of Delaware Application July 19, 1945, Serial No. 605,913

3 Claims. (Cl. 123—146.5)

This invention relates to internal-combustion engines and, more particularly, to a means for coupling an ignition distributor to a driving means.

It is an object of my invention to provide a method of coupling an ignition distributor to a driving means in an internal-combustion engine, so that adjustments to the timing of the ignition may be made without the necessity of visually observing the relative positions of the crankshaft, flywheel or timing gears and without the necessity of removing the covers of these parts.

A second object of this invention is to provide a distributor coupling device which will facilitate the removal of the distributor for adjustment, cleaning, repair or replacement and permit the reinstallation of such distributor by other than highly trained technicians.

A further object of my invention is to provide an ignition distributor coupling device which will permit the complete removal of the distributor, and its reinstallation, without disturbing the internal adjustments of the distributor and without the necessity for retiming the ignition of the engine.

It is also an object of my invention to provide an ignition distributor coupling device which will permit the interchange or installation of factory or "pretimed" distributors with no necessity for retiming the engine upon such interchange.

I have as a further object for my invention, a distributor coupling device which will permit the coupling of a factory or "pretimed" ignition distributor to a system of auxiliary shafts and gearing, rather than directly to the camshaft, so that necessary adjustments in the relationship between the pistons, the auxiliary gearing and shafts and the distributor itself, can be made without disturbing the pretimed characteristics of the distributor.

Another object of my invention is to provide a distributor coupling which will be simple in construction, positive in operation, easily accessible for adjustment or inspection and economical to service or replace.

Still a further object of this invention is to provide a distributor drive coupling which may be accurately and quickly timed by the average mechanic or automobile owner, with a minimum of tools and/or expensive and techincal equipment.

A further object is to provide a means of timing, or adjusting said coupling, which adjusting or timing means will be simple in principle but effective in operation and, most importantly, will be easily operated by any automobile serviceman or owner with a minimum of instruction.

It is well known that ignition distributors of internal-combustion engines are generally driven by the camshaft or crankshaft of the engine through a series of gears which include both spur and spiral or worm gears. Further, that these gears maintain a definite position, when once assembled, with relation to the pistons and valves and that the breaker points of the distributor must open and close in a synchrony of motion with the travel of the pistons and the opening and closing of the valves. Any disturbance caused in the settings of the timing gears or breaker points or the cam which actuates the latter, results in the mistiming of the engine and some means must therefore be provided for the adjustment or "setting" of the timing. Generally, such timing is done by opening either the flywheel casing or timing gear casing, or both, revolving the crankshaft, flywheel, and timing gears until certain designated points are reached on such flywheel or gears, determining that a predetermined piston is in the proper position to receive an ignition spark and then installing the distributor so that the cam or contact rotor in such distributor is in a mathematically determined position dependent upon certain characteristics of the engine involved to deliver such spark to the said predetermined piston.

The use of spiral or worm type gears, commonly employed in the art to connect the distributor drive shaft to the camshaft or crankshaft, and the common inaccessible location of such gears prevents the timing of the distributor through adjustment of the respective positions of the shafts and gears with relation to the distributor. Even though such gears were readily accessible for adjustment and could be set at will, it would be found that the degree of accuracy necessary in the timing of an ignition system would not be attainable through mere gear adjustment. This is especially true in the modern internal-combustion engines whose gears are made under production methods with tolerances too liberal for ignition timing purposes.

In an attempt to provide an adequate adjustment of the rotor and rotor cam of the distributor for proper timing, the breaker point cam is generally made adjustable on the end of the distributor rotor drive shaft, within the distributor housing. Adjustments made here, however, are at best inaccurate because of the method which must be employed and which consists of loosening the cam on the shaft and turning such cam until the breaker points, actuated by said cam, have reached a certain point with relation to one another. The adjustment of the cam is extremely important and critical because its action in opening the breaker points controls the passage of the electricity to the combustion chamber. Efficient and correct operation of the engine requires that the breaker points open at the moment the piston is in the best position to receive the spark and although the position of the piston can be determined manually, great difficulty arises in the manual or visual determination of the moment at which the breaker points are opening or about to open. Further difficulties and inaccuracies arise in the pursuit of this timing procedure from the presence of "backlash" which manifests itself in the action of the distributor rotor and cam and which is the result of end play in the auxiliary distributor drive shafts and of necessary looseness in the centrifugal spark mechanism with which the common distributor is now equipped. When timing the common type of distributor by loosening and setting the cam, as set forth hereinbefore, an attempt is generally made to counteract or compensate for backlash by holding the cam against such blacklash while adjusting the cam and attempting to determine the point at which the breaker points will open. This procedure is inefficient and at best is inaccurate and does not insure satisfactory timing.

It is also pointed out that in the conventional distributor drive arrangement, it is necessary to disturb the breaker point cam in its relationship with the valves and pistons when removing the distributor housing for inspection, repair or replacement. This, of course, necessitates retiming the engine when the repaired distributor is again installed.

A further disadvantage in the present distributor and distributor coupling practice is self-apparent when it is remembered that even a new distributor, upon installation for replacement particularly, must be completely timed together with the engine to insure proper ignition and operation.

Because of the difficulties and inaccuracies which arise in the adjustment, replacement or repair of the conventional distributor and distributor drive means, it has been virtually impossible for the average automobile owner to service his own distributor. Further, an accurate, completely efficient timing operation could not be performed without the aid of technical knowledge and equipment which is not to be found in the average small garage or service station. The provision, therefore, of a distributor drive coupling which will facilitate the operations above discussed, will not only insure efficient timing, hence operation, of an automobile engine, but will reduce the maintenance complexities and expenses which now exist.

Accuracy in the timing of the distributor itself can be assured by the timing of the various parts therein by the manufacturer employing electrical testing and adjusting means not available to general mechanics or automobile owners. Factory or pretimed distributors and methods are well-known, and are described in United States patents, Nos. 1,963,657 and 2,065,067.

As set forth in Patent No. 1,963,657, the benefits of pretimed distributors lie in the fact that they are uniformly timed independently of the engine and are capable of being installed on an engine in only one predetermined relation to the engine; however, heretofore, to obtain the full utility of such distributor, it was required that said distributor be driven directly from a driving connection machined on the end of the engine camshaft in an exact predetermined relationship to the several cams thereon.

This requirement arose from the lack of a coupling device which would permit the distributor to be driven through a series of gears and auxiliary shafts with the assurance that the driving connection would be, or could be adjusted to, or would remain in, the required exact predetermined angular relationship with the camshaft.

The lack of a suitable coupling device resulted in the mounting of the pretimed distributor at the end of the camshaft and in many instances this installation was impossible due to the particular motor design or, if possible, generally resulted in the placement of the distributor in a relatively low, inaccessible position on the engine.

The present coupling, however, and the method set forth here for its proper adjustment broadens the possible use of pretimed distributors and permits their use on all engines whose distributors are driven through a series of auxiliary shafts and gears. The instant invention further simplifies the servicing of distributors and ignition systems by permitting the removal, inspection, repair and replacement of a distributor without disturbing the settings, adjustments, or timing of the auxiliary gear and shaft drive system. Further, this removal and replacement, and the entire timing method as covered herein does not require any high degree of mathematical or automotive technical skill nor complicated equipment and may be performed by the average mechanic or automobile owner.

With these and other objects and improvements in view, the invention consists in the arrangement, construction and combination of the various parts of the improved device as described in the specification, claimed in the claims and illustrated in the accompanying drawings, in which:

Figure 1:
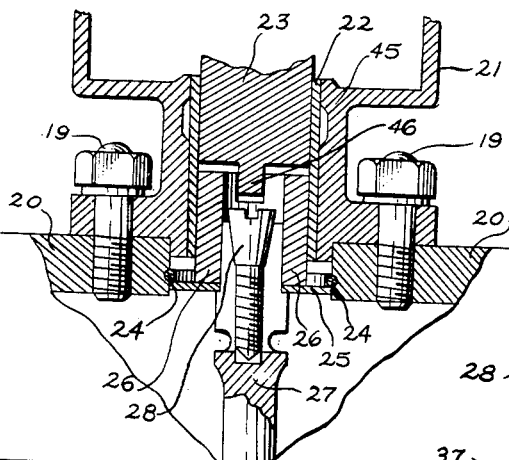
Figure 1 is an elevation of the new coupling device in section, depicting the manner in which the coupling is assembled and positioned with respect to the distributor.
Figure 3:
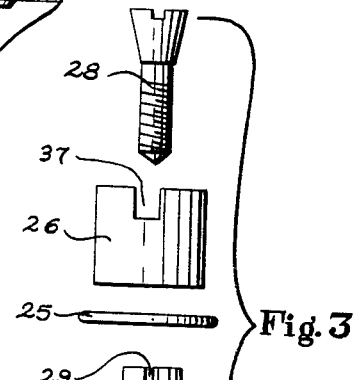
Figure 3 is an exploded view of the coupling depicting the component parts of said coupling.

As revealed in Figures 1 and 3, the coupling device comprises a shaft 27, taper bored, tapped and longitudinally slotted at its upper or distributor end with said slotted end of two diameters so as to provide a shoulder on the outer periphery of said shaft midway of said longitudinal slots with the smaller diameter at the upper or distributor end of the shaft; a thrust washer 25 whose outer periphery is substantially larger than that of shaft 27, but whose inner diameter is slightly larger than the small diameter of said shaft; a tube having a diametrically offset slot through one end, the inner diameter of said tube being slightly larger than the smaller diameter of said shaft; a retaining spring 24; and a tapered set screw 28.

When assembled, as shown in Figure 1, the slotted end of shaft 27 protrudes from an opening provided in the cylinder block of the engine. The lower end of the shaft, which is not shown, terminates with a conventional tongue and slot type coupling by which it is joined to a gearing system, camshaft, oil pump, etc., whichever, in the particular instance is intended to drive the distributor. The instant invention does not include the lower coupling of the shaft 27, however, and no further consideration will be given it except to say that the weight of the shaft 27 rests upon said lower coupling and that this coupling is used to drive the distributor coupling concerned here.

As indicated in Figure 1, with shaft 27 in position in the cylinder block 20, thrust washer 25 is placed over the end of shaft 27 so as to rest on shoulder 30.

Thrust washer 25 is held in place by a circular retaining spring 24 which rests in a groove cut in the wall of the cylinder block hole. Tube 26 is then placed over the end of shaft 27, so that the diametrically offset slot across the end of tube 26 is uppermost. Tapered screw 28 is then threaded into the tapered hole in the slotted end of shaft 27 and tightened down. The action of the tapered screw 28, as it is drawn down into the shaft, exerts an even outward pressure against the inner periphery of shaft 27 sufficient to widen the expansion slots 29 and to force the slotted portion of the shaft against the inner periphery of slotted tube 26. The expansion action of the slotted section of shaft 27 is facilitated by groove 31, which acts as a pivot point for the sections of the shaft expanded outwardly by tapered screw 28.

It is apparent that positive and extreme pressure can be created between the slotted portion of shaft 27 and tube 26 and that through such pressure, tube 26 is held rigidly against the shaft. When fully tightened as explained above, there is no slippage nor vibration between the shaft and the tube and the two pieces revolve as one.

With the coupling assembled as indicated, a pretimed, or factory timed distributor 21 is placed over said coupling and fastened in place on studs 19. As shown in Figure 1, distributor 21 is equipped with a central or rotor shaft 23 which has at its lower or coupling end, an appendage 46 diametrically offset on said shaft adapted to fit slidably into slot 37 in the tube 26. As shown in Figure 1, the distributor 21 is constructed with a sleeve bearing 22 extending beyond the lower extremity of shaft 23 sufficient to form a receptacle for tube 26 and to provide support and a bearing surface for said tube. Lubrication normally supplied to said bearing 22, through lubrication channels 45 also supplies tube 26 and thrust washer 25. The details of construction with respect to the bearing 22 and the lubrication channels 45 as shown here are not essential to the present invention however, and may vary in accord with the distributor used. It is apparent, too, that the degree of diametric offset of the slot in the housing may be varied within certain limits without changing the function of the drive coupling. It follows that such variations, however, must be accompanied by similar variations in the appendage in the rotor shaft of the distributor to insure the joining of the coupling to the distributor in but one rotational position.

Figure 2:
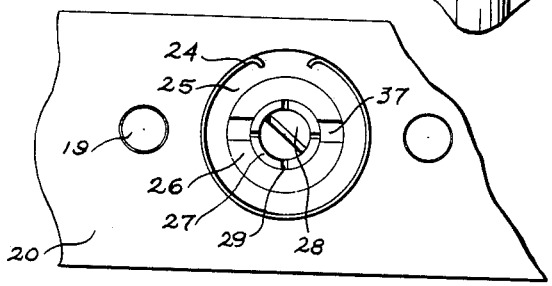
Figure 2 is a plan view of the coupling device.

From Figure 2, a plan view of the coupling with the distributor removed, it can be seen that all parts of the coupling device are easily accessible. The tube 26 can be adjusted with relation to the shaft 27 by loosening tapered screw 28 and revolving tube 26 with the fingers; to remove the coupling for inspection, repair or replacement, it is merely necessary to remove retaining spring 24 whereupon the entire assembly may be lifted from its receptacle.

Figure 4:
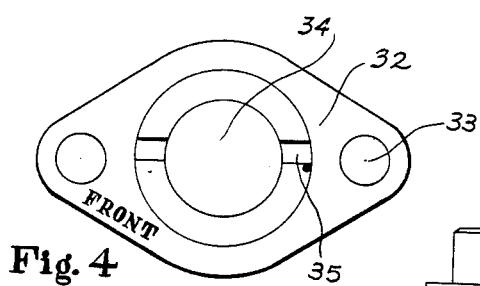
Figure 4 is a plan view of a fixture used in the adjustment of the coupling device.
Figure 5:
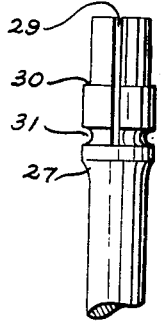
Figure 5 is an elevation of the adjusting fixture.

As mentioned hereinbefore, the instant invention is intended primarily for use with ignition distributors which have been timed or set in the factory; that is, the relationship between the breaker points and the cam actuating them has been accurately set by electrical and mechanical means to assure perfect ignition timing in the distributor. If then the engine itself can be set manually so that a designated piston is in the proper position to best receive the ignition spark and if the distributor rotor shaft can be rotated by hand until it is in a predetermined and known position as will deliver that spark to that piston, the two may be combined and a perfect timing condition will exist. In the pretimed distributor depicted in Figure 1, it is apparent from what has been here related, that the position of the breaker points can be determined by the position of shaft 23, particularly when the appendage 46 on the shaft is offset diametrically as is provided for in the present invention to provide but one position of coupling when the drive coupling is properly adjusted. To insure an accurate timing condition with the coupling concerned here, therefore, requires only that the engine be set in a given position, the distributor shaft turned manually to its corresponding position and the slotted tube 26 loosened, set and tightened to receive the distributor shaft as to maintain both the distributor shaft and the engine coupling shaft in their relative positions. The method of timing an internal-combustion engine using the coupling concerned here is illustrated by reference to Figures 4, 5, and 6. Figures 4 and 5 represent a plan view and an elevation, respectively, of a timing fixture 32 comprising a bushing formed with a lower collar 36 to correspond with and insert into the cylinder block recess surrounding the distributor drive coupling; with two stud holes 33 corresponding with distributor mounting studs 19 and with an upper collar having a radially offset slot across its upper end, said radial slot to correspond with the radial slot 37 in tube 26 and with the offset appendage 46 in distributor shaft 23, said bushing having its forward end so designated to insure proper positioning on studs 19.

Figure 6:
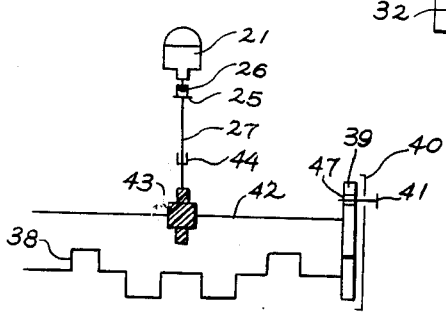
Figure 6 is a schematic diagram of an internal-combustion engine depicting the timing gear and distributor drive mechanism.

Figure 6 depicts schematically an internal-combustion engine in which the distributor 21 is driven through gears 43, shaft 27 and couplings 44 and 26, from camshaft 42. Shown also is a known method of determining the position of timing gear 39, hence the pistons, using an indexing pin 41 which is inserted through the timing gear cover 40. In using this method of determining and setting the positions of the pistons an index hole provided in the camshaft drive gear will correspond with a similar hole in the timing gear cover when a certain designated piston is in the proper position to receive the ignition spark.

With this arrangement, therefore, the crankshaft is revolved manually until pin 41 will seat in hole 47. This signifies that a certain known piston is in position to fire, and accordingly, coupling 26 can be set to receive the pretimed distributor.

In relating the steps to be followed in timing an engine under the method concerned here, it will be assumed that the indexing hole 47 is positioned so that when in line with pin 41, piston number 1 is at the top of its stroke or in a fire position, it will also be assumed that the pretimed distributor to be used has been adjusted so that the breaker points and rotor are in position to deliver the spark to piston #1 when the offset appendage 46, looking toward the front of the engine, is parallel with but to the right of a line passing through the centers of studs 19. Further, that the offset slot 35 in the upper collar of fixture 32 is also to the right of and parallel to a line passing through the stud holes 33 when looking toward that end of the fixture designated "front."

To time an internal-combustion engine using this method, the crankshaft 38 is revolved manually until pin 41 locates in hole 47, at which time piston #1 will be at the top of its stroke and in the "fire" position. At this point, fixture 32 is placed in position on studs 19 with the front of said fixture toward the front of the engine, taper screw 28 is then loosened and tube 26 is turned around shaft 27 until the offset slot 37 in said tube corresponds in position with the slot 35 in the fixture 32. Taper screw 28 is tightened, securely fastening tube 26 in place on shaft 27 and the fixture 32 is removed. The pretimed distributor 21 is then installed on studs 19 so that appendage 46 rests in slot 37. Index pin 41 is removed and the distributor 21 is tightened down on studs 19. This completes the operation and the result is an accurately and correctly timed engine and ignition system. Although, for the purposes of explanation, an internal-combustion engine was described having an index pin positioned to insert into a hole in a timing gear, it is apparent that the coupling concerned here can be used and properly adjusted using other methods of determining the proper position of a given piston.

It is important to note that the utility of the invention is further increased by the fact that no special tools, equipment, or knowledge are needed to properly adjust the coupling here concerned to accommodate and properly operate a pretimed distributor. A fixture 32 has been portrayed and described for use in accurately setting the coupling and it is obvious that the fixture would facilitate and insure accurate adjustment. However, the coupling is by no means incapable of accurate adjustment without such fixture, because, as can be readily understood, if the individual making the adjustment is cognizant of the fact that the distributor is prepared to supply a particular cylinder with an electrical charge where the diametrically offset tongue is in a certain position, then it is necessary for him to merely raise that piston to its fire position, loosen the slotted tubular sleeve and set it in a proper position to receive the offset tongue of the distributor.

If, as was assumed hereinbefore, the proper adjustment setting of the distributor is with the #1 piston at the top of its stroke and with the offset tongue on the distributor shaft to the right of, but parallel to, a line passing through the centers of the distributor mounting studs, then the tubular sleeve of the coupling can be loosened and also set with its slot parallel to but to the right of a line passing through the distributor mounting studs and tightened.

Some changes may be made in the arrangement, construction, and combination of the various parts of the improved device without departing from the spirit of the invention, and it is the intention to cover by the claims, such changes as may be reasonably included in the scope thereof.

It is claimed as the invention:

1. In combination, in an internal-combustion engine ignition distributor drive system wherein said distributor is actuated through a series of gear trains and auxiliary shafting and wherein said ignition distributor has been pretimed and adjusted independently of said internal-combustion engine and has across the protruding end of its rotor drive shaft a diametrically offset tongue appendage, a distributor drive coupling comprising a shaft joined to said gear train and auxiliary shaft series as to receive coaxial rotation therefrom, said shaft protruding through an opening in an exterior wall of said internal-combustion engine and having, in the protruding end of said shaft, a tapered and threaded hole along the longitudinal center of said shaft, the said hole extending along the length of said shaft to a point within the exterior wall of said engine, a series of longitudinal slots in the protruding end of said shaft, said slots being adjacent to and joining with said longitudinal tapered hole in said shaft and being in length comparable to said threaded hole, a tapered screw adapted to insert into said tapered hole in said shaft and to exert outward pressure on the walls of said hole and to expand said walls and said shaft adjacent to said slots, a shoulder in the outer periphery of said shaft adjacent to said slots, a washer adapted to be slidably mounted on said shoulder and to be slightly smaller in outer periphery than the opening in the exterior wall of said engine through which the said shaft protrudes, a retaining spring adapted to adhere to the inner wall of said opening in said engine wall and to exert constant restraining pressure on said shoulder through said washer, a tubular sleeve having an inner periphery slightly larger than the outer periphery of the slotted section of said shaft adapted to be adjustably mounted on the protruding slotted end of said shaft as to rest upon said washer, to extend slightly beyond the protruding end of said shaft, and to be rigidly held to said shaft when the slotted section of said shaft is expanded by said tapered screw, a slot across the protruding end of said tubular sleeve, said slot being diametrically offset to a predetermined degree as to coincide with and receive the protruding tongue appendage formed across the end of the said distributor rotor drive shaft and an alignment fixture having a diametrically offset guide lot positioned in agreement with the characteristics of said distributor.

2. In an internal combustion engine, a driving system for the ignition apparatus terminating in a shaft the driving end of which is substantially flush with a surface of the engine, and a collar secured to the driving end of said shaft, said collar being capable of rigid attachment to the shaft in an infinite number of angular relationships and being unsymmetrically slotted to receive a mating member of the ignition apparatus.

3. In an internal combustion engine, a driving system for the ignition apparatus terminating in a shaft the driving end of which is substantially flush with a surface of the engine, and a collar secured to the driving end of said shaft, said collar being capable of rigid attachment to the shaft in an infinite number of angular relationships, being unsymmetrically slotted to receive a mating member of the ignition apparatus and being journaled in the same bearing which supports the mating member.

EMIL ZOERLEIN.

REFERENCES CITED

The following references are of record in the file of this patent:

UNITED STATES PATENTS

| Number | Name | Date |
|---|---|---|
| 1,616,428 | Ringwald | Feb. 1, 1927 |
| 1,993,992 | Ford | Mar. 12, 1935 |
| 2,016,669 | Davis | Oct. 8, 1935 |
| 2,162,338 | Larsen | June 13, 1939 |
| 2,218,048 | Meyer | Oct. 15, 1940 |
| 2,238,649 | Kishline | Apr. 15, 1941 |
| 2,316,188 | Rose | Apr. 13, 1943 |
| 2,437,283 | Viers | Mar. 9, 1948 |